(No Model.)
W. R. ANDREWS.
CULTIVATOR ATTACHMENT FOR PLOWS.
No. 306,992. Patented Oct. 21, 1884.
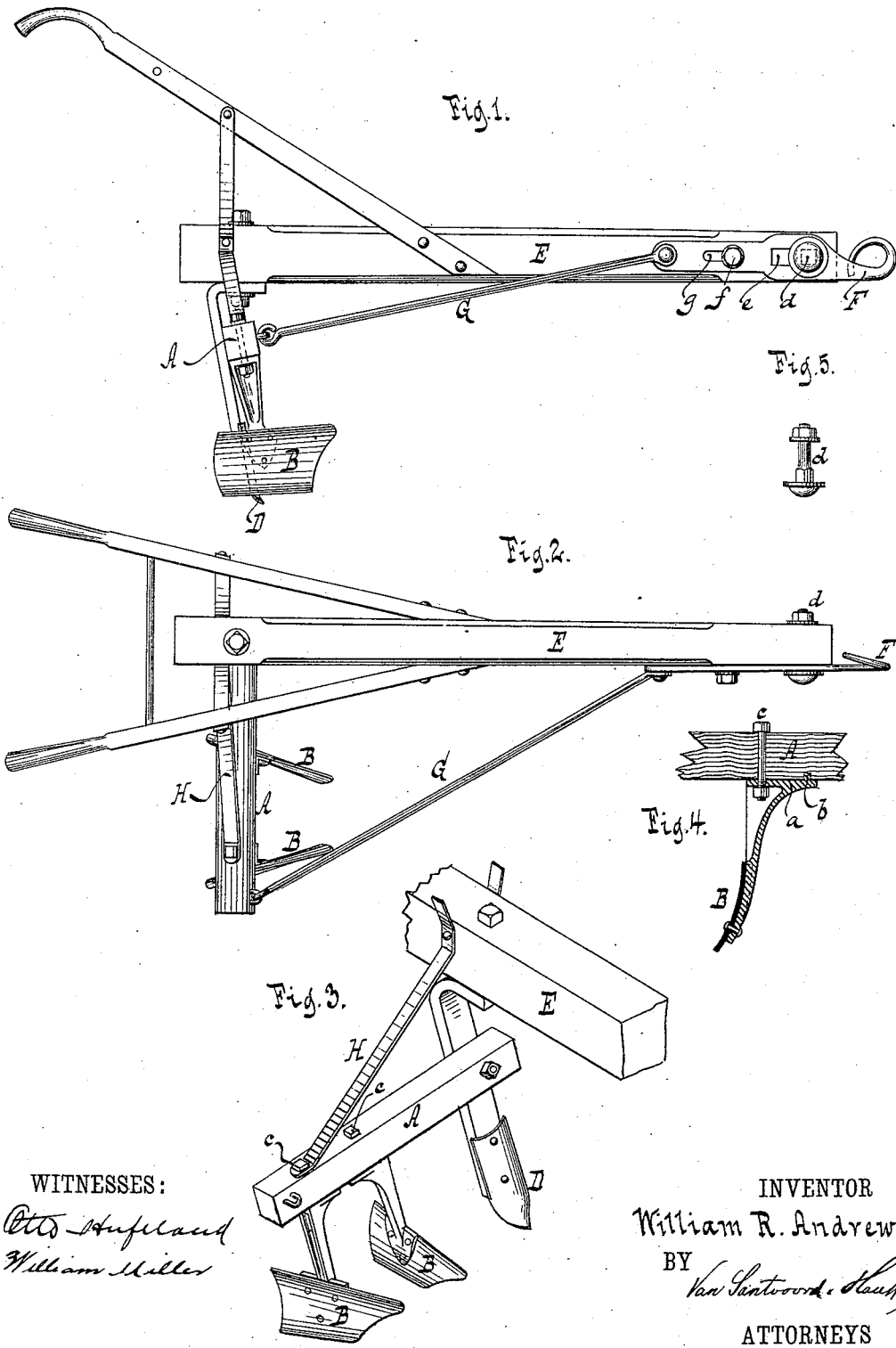
WITNESSES:
INVENTOR
William R. Andrews
BY
Van Santvoord & Hauff
ATTORNEYS

UNITED STATES PATENT OFFICE.

WILLIAM R. ANDREWS, OF NEWARK, NEW JERSEY.

CULTIVATOR ATTACHMENT FOR PLOWS.

SPECIFICATION forming part of Letters Patent No. 306,992, dated October 21, 1884.

Application filed July 24, 1884. (No model.)

*To all whom it may concern:*

Be it known that I, WILLIAM R. ANDREWS, a citizen of the United States, residing at Newark, in the county of Essex and State of New Jersey, have invented new and useful Improvements in Cultivator Attachments for Plows, of which the following is a specification.

The object of my invention is to produce a simple, cheap, and convenient cultivating attachment for plows, said attachment being so constructed that it can be readily secured to or detached from the plow, and that the same, when secured to the plow, can be easily guided through the rows in a straight line.

The peculiar and novel construction of my cultivating attachment is pointed out in the following specification and claims, and illustrated in the accompanying drawings, in which—

Figure 1 represents a side view of a cultivator with my attachment. Fig. 2 is a plan or top view of the same. Fig. 3 is a perspective of my attachment, showing parts of the plow. Figs. 4 and 5 are details.

Similar letters indicate corresponding parts.

In the drawings, the letter A designates the beam of my cultivating attachment. In this beam are secured two plowshares, B B, which, in the example shown in the drawings, are inclined toward each other, but the form of which may be changed in accordance to the work to be accomplished.

In order to make the plowshares B B easily removable, their standards are provided with flanges $a$, Fig. 4, each of which is provided with a steady-pin, $b$, and with a hole for a screw-bolt, $c$. By removing this screw-bolt the plowshare can be removed and another of different form can be attached in its place with very little trouble or loss of time. The beam A is secured at its inner end to the standard C, which carries the plowshare D, and which is secured to the beam E of the plow by a screw-bolt or other suitable means. To the outer end of this main beam E is attached the clevis F, which connects by a rod, G, with the outer end of the beam A. The clevis is fastened to the main beam E by a screw-bolt, $d$, which passes through a slot, $e$, in the clevis-plate, and through a round hole in the beam, said screw-bolt being made in the form shown in Fig. 5, so that when its nut is drawn up tight the clevis will be free to move backward or forward. An additional screw, $f$, which passes through a slot, $g$, in the clevis-plate, serves to guide the clevis in its backward or forward movement. The object of this construction of the clevis is to throw the strain of the draft animal directly upon the outer end of the beam A, thereby retaining the implement when provided with my attachment in a straight course, and enabling the plowman to guide the same with the same ease with which he can guide the plow without my attachment.

From the outer end of the beam A extends a brace, H, to the rear end of the main beam E, and it is attached to the main beam by a screw, so that it can be easily detached.

What I claim as new, and desire to secure by Letters Patent, is—

1. The combination, substantially as herein described, of the secondary beam A, the plowshares attached thereto, the rod G, and the clevis F, provided with slots $e$ and $g$.

2. The combination, substantially as herein described, with the plow, of the secondary beam A, the plowshares attached thereto, the clevis F, attached to the main beam E, and being free to move backward or forward, and the rod G, extending from the outer end of the beam A to the clevis F.

In testimony whereof I have hereunto set my hand and seal in the presence of two subscribing witnesses.

WILLIAM R. ANDREWS. [L. S.]

Witnesses:
W. HAUFF,
E. F. KASTENHUBER.